(12) United States Patent
Itoh et al.

(10) Patent No.: US 6,625,370 B2
(45) Date of Patent: Sep. 23, 2003

(54) OPTICAL WAVEGUIDE AND FABRICATING METHOD THEREOF, AND OPTICAL WAVEGUIDE CIRCUIT

(75) Inventors: Mikitaka Itoh, Mito (JP); Ryoichi Kasahara, Mito (JP); Takashi Saida, Mito (JP); Yasuhiro Hida, Hitachinaka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/931,684

(22) Filed: Aug. 16, 2001

(65) Prior Publication Data

US 2002/0048443 A1 Apr. 25, 2002

(30) Foreign Application Priority Data

Aug. 22, 2000 (JP) ...................................... P2000-250770

(51) Int. Cl.⁷ .................................................. G02B 6/10
(52) U.S. Cl. ...................... 385/132; 385/129; 385/131
(58) Field of Search ................................. 385/129–132, 385/142, 144, 147, 123–126, 128

(56) References Cited

U.S. PATENT DOCUMENTS 4,965,525 A * 10/1990 Zah ............................ 330/4.3
5,363,457 A * 11/1994 Falt et al. ...................... 385/3
6,326,646 B1 * 12/2001 Baillargeon et al. .......... 257/94
6,389,209 B1 * 5/2002 Suhir ........................ 385/129

FOREIGN PATENT DOCUMENTS

JP          3-134602          6/1991

* cited by examiner

Primary Examiner—Lynn D. Feild
Assistant Examiner—Son V. Nguyen
(74) Attorney, Agent, or Firm—Darby & Darby

(57) ABSTRACT

An optical waveguide and an optical waveguide circuit having polarization insensitivity or a required low-level polarization dependence without degradation of the optical characteristics and reliability are disclosed, and a fabricating method of an optical waveguide and an optical waveguide circuit having polarization insensitivity or a required low-level polarization dependence without increasing the fabricating burden and the cost are disclosed. The optical waveguide comprises a planar substrate; a lower cladding which is provided on the planar substrate, where the lower cladding has a ridge; a core, provided on the ridge of the lower cladding, for transmitting light; and an upper cladding provided in a manner such that the core is covered with the upper cladding. The ridge has a shape predetermined so as to decrease polarization dependence of the optical waveguide to a required low level.

25 Claims, 6 Drawing Sheets

OPTICAL WAVEGUIDE AND FABRICATING METHOD THEREOF, AND OPTICAL WAVEGUIDE CIRCUIT

BACKGROUND OF THE INVENTION

1. Field of the Invention

The present invention relates to an optical waveguide and a fabricating (or manufacturing) method thereof, and an optical waveguide circuit, used in the fields of optical communication, optical signal processing, and optical measurement.

2. Description of the Related Art

Due to the worldwide spread of the Internet, optical communication systems using a WDM (wavelength-division multiplexing) technique or the like have spread commercially, in particular, into North America and the like. The WDM technique enables high-speed transmission of large amounts of data such as image data or video data.

Accordingly, research and development of lightwave (or optical) circuits constituting optical communication systems has been accelerated. In particular, waveguide-type lightwave circuits (i.e., optical waveguide (or wave-guiding) circuits), which can include optical waveguides formed on a single planar substrate by using the LSI fine-processing technique, have become the focus of attention because they have a high degree of integration and superior mass productivity, and accordingly, lightwave circuits having superior performance and a complicated structure can be realized using such optical waveguide circuits.

That is, optical waveguide circuits can provide various kinds of lightwave circuits by using functions of optical interference. In particular, optical wavelength-division multiplexing and demultiplexing devices are key devices in WDM systems.

FIG. 5A shows an arrayed-waveguide grating (AWG) type optical wavelength-division multiplexing and demultiplexing device as an example of the optical waveguide circuits. This AWG type optical wavelength-division multiplexing and demultiplexing device comprises input channel waveguides 1, output channel waveguides 2, a channel waveguide array 3, an input slab waveguide 4 for connecting the input channel waveguides 1 and the channel waveguide array 3, and an output slab waveguide 5 for connecting the output channel waveguides 2 and the channel waveguide array 3.

FIG. 5B shows an asymmetric Mach-Zehnder interferometer (MZI) type optical attenuator as another example of the optical waveguide circuits. In this device, two input waveguides 6, two output waveguides 7, and two arm waveguides 8 are connected with each other via two 3-dB directional couplers 9, and a thin-film heater type phase shifter 10 is formed on each arm waveguide 8.

FIG. 6 is a cross-sectional view of a conventional optical waveguide. On a silicon (Si) substrate 11, a lower cladding 12, a core 13, and an upper cladding 14 are formed.

Here, the polarization state of an optical signal passing through an optical network is not controlled; thus, the relevant optical waveguide circuit must have polarization-insensitive characteristics.

However, in the actual optical waveguide circuit, the core of each optical waveguide has geometrical birefringence or stress-induced birefringence, which causes polarization dependence. In particular, even if a silica-based optical waveguide circuit is employed and the core of each optical waveguide has an almost square cross-sectional shape (in this case, the geometrical birefringence can significantly be disregarded), the material and composition of the substrate generally differ from those of the waveguide portion; thus, various kinds of stress components are imposed on the core, and in most cases, stress imposed in the horizontal direction is not the same as that imposed in the vertical direction. As a result, due to photoelasticity, difference of the refractive index between the horizontal direction and the vertical direction (that is, stress-induced birefringence) occurs, thereby generating polarization dependence in the optical wave-guiding characteristics.

FIG. 3A is a graph showing an example of the optical transmitting characteristics of an AWG type optical wavelength-division multiplexing and demultiplexing device which is fabricated using silica-based glasses. FIG. 4A is a graph showing an example of the optical transmitting characteristics of an asymmetric MZI type attenuator which is also fabricated using silica-based glasses. As shown in each figure, in each example, a TM mode and a TE mode indicate different optical output characteristics, that is, polarization dependence is present.

In order to resolve such polarization dependence, a method of controlling the composition of the optical waveguide circuit (Reference 1:S. Suzuki et al., "Polarization-Insensitive Arrayed-Waveguide Gratings Using Dopant-Rich Silica-Based Glass with Thermal Expansion Adjusted to Si Substrate", Electronics Letters, Vol. 33, No. 13, pp. 1173–1174, 1997; and Reference 2:S. M. Ojha et al., "Simple Method of Fabricating Polarization-Insensitive and Very Low Crosstalk AWG Grating Devices", Electronics Letters, Vol. 34, pp. 78–79, 1998), and a method of inserting a wave plate (Reference 3:Y. Inoue et al., "Polarization Mode Converter with Polyimide Half Waveplate in Silica-Based Planar Lightwave Circuits", IEEE Photonics Technology Letters. Vol. 6, No. 5, pp. 175–177, 1994) are known.

The features of such conventional methods are shown in Table 1.

TABLE 1

| | OPTICAL CHARACTERISTICS | PRODUCTIVITY | COST | RELIABILITY OF DEVICE |
|---|---|---|---|---|
| COMPOSITION CONTROL | ○ | ○ | ○ | X (crack etc.) |
| WAVE PLATE INSERTION | Δ (increase of loss) | X | X | ○ |
| PRESENT INVENTION | ○ | ○ | ○ | ○ |

The method of controlling the composition has superior optical characteristics, productivity, and cost effectiveness; however, when this method is employed, the reliability of the device degrades. For example, when silica-based glasses are used, the stress inside the glass changes from compressive stress to tensile stress owing to the composition control. Therefore, the glass portion of the waveguide may easily have a crack or the like. Similarly, in an optical waveguide circuit using optical waveguides made of a material other than silica-based glasses (that is, a polymer or the like), the composition for realizing the polarization insensitivity does not always agree with the composition for obtaining the reliability of the device.

Currently, the method of inserting a wave plate is the leading method because the reliability of the device does not degrade. However, the power loss of the signal increases by approximately 0.5 to 1.0 dB, and generally, it is difficult to obtain preferable productivity and cost effectiveness in this method. This is because both the process of forming a groove for inserting a wave plate and the process of inserting the wave plate must be performed for each finished chip of the optical waveguide circuit.

As explained above, no currently-known method of realizing polarization insensitivity can satisfy both (i) the required characteristics related to the device, such as the optical characteristics and reliability, and (ii) the required productivity and cost effectiveness.

SUMMARY OF THE INVENTION

In consideration of the above circumstances, an object of the present invention is to provide an optical waveguide and an optical waveguide circuit having polarization insensitivity or a required low-level polarization dependence without degradation of the optical characteristics and reliability, and to provide a fabricating method of an optical waveguide and an optical waveguide circuit having polarization insensitivity or a required low-level polarization dependence without increasing the fabricating burden and the cost.

The above and other objects, and distinctive features of the present invention will be shown by the following explanations and attached drawings.

Therefore, the present invention provides an optical waveguide comprising:
 a planar substrate;
 a lower cladding which is provided on the planar substrate, where the lower cladding has a ridge;
 a core, provided on the ridge of the lower cladding, for transmitting light; and
 an upper cladding provided in a manner such that the core is covered with the upper cladding, and wherein:
 the ridge has a shape predetermined so as to decrease polarization dependence of the optical waveguide to a required (or desired) level.

Preferably, the ridge has a shape predetermined so as to make the polarization dependence of the optical waveguide substantially zero.

In this case, typically, the height of the ridge is determined so as to satisfy the condition that with given geometrical birefringence $B_0$ and photoelastic constants $C_1$ and $C_2$, a horizontal stress component $\sigma x$ imposed on the core from the upper and lower cladding and a vertical stress component $\sigma y$ imposed on the core from the upper and lower cladding have the following relationship:

$$\sigma x - \sigma y = B_0/(C_2 - C_1).$$

It is also possible that the height of the ridge is determined so as to satisfy the condition that a horizontal stress component $\sigma x$ imposed on the core from the upper and lower cladding is substantially equal to a vertical stress component $\sigma y$ imposed on the core from the upper and lower cladding. Typically, the cross section of the core has a substantially square shape.

In the above basic structure, the planar substrate, the lower cladding, the core, and the upper cladding may have the following relationship:

$\rho_{sub} > \rho_{upper} > \rho_{core} \geq \rho_{lower}$, or
$\rho_{sub} > \rho_{upper} > \rho_{lower} > \rho_{core}$ where $\rho_{sub}$, $\rho_{lower}$, $\rho_{core}$, and $\rho_{upper}$ are average thermal expansion coefficients of the planar substrate, the lower cladding, the core, and the upper cladding within the temperature range of $0 \leq T \leq T_S$, $T_S$ being the softening temperature of the upper cladding.

As a typical example, the width of the ridge is equal to the width of the core. However, it is possible that the width of the ridge is not constant in the direction of its height.

Typically, the planar substrate is made of silicon, and the optical waveguide is made of silica-based glasses.

The present invention also provides an optical waveguide circuit having at least one optical waveguide as explained above. Typically, the optical waveguide circuit uses functions based on optical interference.

As a typical example, the optical waveguide circuit includes an arrayed-waveguide grating having a plurality of the optical waveguides, or an asymmetric Mach-Zehnder interferometer having a plurality of the optical waveguides.

The present invention also provides a method of fabricating an optical waveguide, comprising the steps of:
 forming a lower cladding layer on a planar substrate;
 forming a core layer on the lower cladding layer;
 processing the core layer so as to make a core of the optical waveguide, wherein the lower cladding layer under the core layer is successively excavated to a predetermined depth so as to form a lower cladding and a ridge of the lower cladding of the optical waveguide; and
 forming an upper cladding layer functioning as an upper cladding of the optical waveguide in a manner such that the processed core is covered with the upper cladding layer.

Preferably, in the step in which the ridge is formed, the ridge has a shape predetermined so as to make the polarization dependence of the optical waveguide substantially zero.

Here, typical examples relating to the shape of the processed ridge or the like are similar to those described above for the optical waveguide.

In the method of fabricating the optical waveguide as explained above, a core layer may be deposited and processed after the ridge of the lower cladding is formed. However, in this case, an additional processing step is necessary, and thus the burden on the processing increases. According to the fabricating method of the present invention, the ridge of the lower cladding can be simultaneously formed only by slightly increasing the time of etching performed when the core is processed.

The effects obtained by the disclosed present invention will be shown below:
(i) The stress imposed on the core can be changed, thereby realizing an optical waveguide circuit having polarization insensitivity or small polarization dependence with a required low level.
(ii) No additional fabricating process is necessary; thus, a polarization-insensitive type optical waveguide circuit can be realized without degradation of the device characteristics and without increasing the burden on the productivity and the cost.

(iii) The present invention can be applied to various kinds of optical waveguide circuits made by different fabrication methods, made of different materials, having different compositions, and having different specifications.

(iv) The present invention can be applied to various lightwave circuits such as wavelength-division multiplexing and demultiplexing devices, optical resonators, attenuators, thermo-optic switches using an asymmetric MZI, delay lines, and the like.

Here, Japanese Unexamined Patent Application, First Publication No. Hei 5-88037 titled "Garnet Waveguide and Production Thereof" discloses an example of a structure having a ridge under the core. As represented by this example, in the actual process of processing the core of the optical waveguide, the lower cladding layer may be slightly removed according to a design specification so that the core layer can be properly processed even if a processing error is present.

However, the object of the present invention for providing the optical waveguide is not to properly process the core. The present invention is to provide an optical waveguide having polarization-insensitive optical characteristics and an optical waveguide circuit using such optical waveguides based on the novel knowledge that the stress imposed on the core can be flexibly changed by providing a ridge under the core and suitably changing the height of the ridge. Therefore, the present invention is novel and the ridge in the conventional structure does not have a predetermined shape which would decrease the polarization dependence of the optical waveguide to a required (or desired) low level.

Japanese Unexamined Patent Application, First Publication No. Hei 8-160234 also discloses an optical wave-guiding element in which the cladding layer of a semiconductor optical wave-guiding element has a ridge structure. However, in this structure, owing to the stripe structure of an optical wave-guiding layer, geometrical birefringence is controlled and the polarization dependence of the optical wave-guiding layer is decreased. That is, in this case, the internal stress imposed from an embedded polyimide layer onto the core is not changed by providing a ridge structure in the cladding layer. That is, also in this structure, the ridge does not have a predetermined shape which would decrease the polarization dependence of the optical waveguide to a required low level, and thus the object, structure, and function of this conventional example differ from those of the present invention.

DESCRIPTION OF THE PREFERRED EMBODIMENTS

Figure 1A:
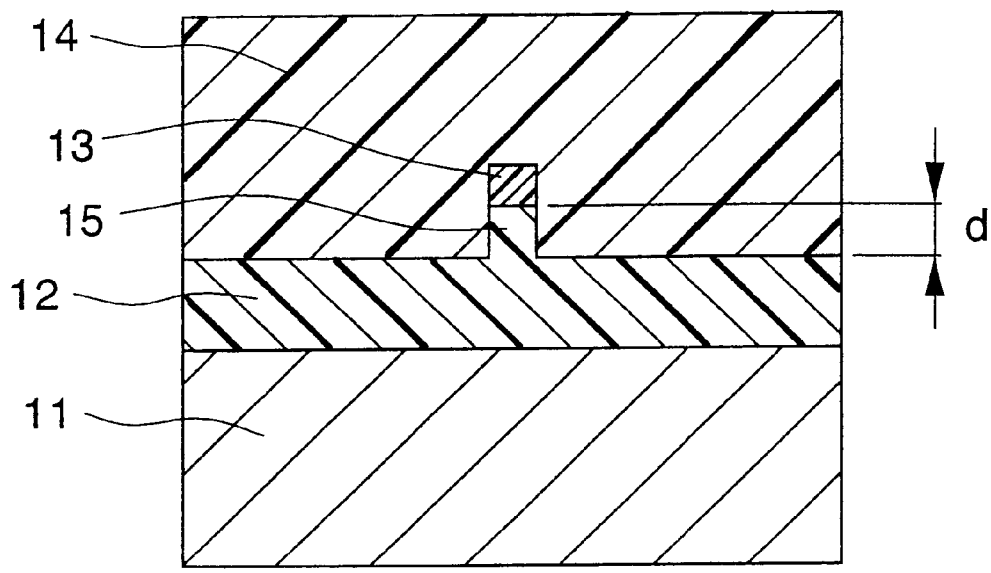
FIG. 1A is a cross-sectional view showing the general structure of the optical waveguide as the first embodiment of the present invention.

First, the general principle of the present invention will be explained (Reference 4:K. Okamoto, "Fundamentals of Optical Waveguides", Optics and Photonics, Academic Press, pp. 109–117, pp. 264–267, 2000).

The horizontal component $n_{TE}$ and vertical component $n_{TM}$ of the effective refractive index in an optical waveguide can be defined by the following formulas:

$$n_{TE}=n_{TE0}-C_1\sigma x-C_2(\sigma y+\sigma z) \quad (1)$$

$$n_{TM}=n_{TM0}-C_1\sigma y-C_2(\sigma x+\sigma z) \quad (2)$$

where $n_{TE0}$ and $n_{TM0}$ denote effective refractive indices when no stress is imposed, $\sigma x$ and $\sigma y$ are stress components imposed on the core, where $\sigma x$ is the horizontal component and $\sigma y$ is the vertical component with respect to the cross section of the substrate, $\sigma z$ is the stress component imposed on the core in the direction along which light is transmitted, and $C_1$ and $C_2$ are photoelastic constants.

According to the above formulas, the birefringence B of the optical waveguide can be defined by the following formula:

$$B=n_{TM}-n_{TE}=n_{TM0}-n_{TE0}+(C_1-C_2)(\sigma x-\sigma y)=B_0+B_S \quad (3)$$

where $B_0=n_{TM0}-n_{TE0}$, and $B_S=(C_1-C_2)(\sigma x-\sigma y)$, that is, $B_0$ denotes geometrical birefringence while Bs denotes stress-induced birefringence.

Therefore, in order to realize a polarization-insensitive optical waveguide, that is, to satisfy $B=B_0+B_S=0$, the term $(\sigma x-\sigma y)$ must satisfy the following formula:

$$\sigma x-\sigma y=B_0/(C_2-C_1) \quad (4)$$

In the above formula (4), values $B_0$, $C_1$, and $C_2$ are determined depending on the materials of the substrate and the optical waveguide, and on the core size. It is also known that $\sigma x$ and $\sigma y$ are also determined depending on the material of the optical waveguide and on the core size. However, the inventors of the present invention found that stress components $\sigma x$ and $\sigma y$ imposed on the core can be changed within a broad range by forming the core on a ridge of a lower cladding and changing the height d of the ridge.

More specifically, if the planar substrate, the lower cladding, the core, and the upper cladding have the following relationship:

$\rho_{sub}>\rho_{upper}>\rho_{core}\geq\rho_{lower}$, or $\rho_{sub}>\rho_{upper}>\rho_{lower}>\rho_{core}$ where $\rho_{sub}$, $\rho_{lower}$, $\rho_{core}$, and $\rho_{upper}$ are average thermal expansion coefficients of the planar substrate, the lower cladding, the core, and the upper cladding within the temperature range of $0 \leq T \leq T_S$ ($T_S$ is the softening temperature of the upper cladding), then compressive stress is imposed on the core, and the condition d=0 provides the relationship of $|\sigma x|>|\sigma y|$, so that the stress-induced birefringence $B_S$ has a large positive value.

However, as the height d increases, the horizontal component of the compressive stress decreases while the vertical component of the compressive stress increases. As a result, the relationship between $\sigma x$ and $\sigma y$ is reversed (i.e., $|\sigma x|<|\sigma y|$), and thus the stress-induced birefringence $B_S$ has a negative value.

Therefore, in consideration of the material and specification of the waveguide, the height d of the ridge is determined so as to satisfy the condition that ($\sigma x-\sigma y$) is equal to $B_0/(C_2-C_1)$, thereby canceling the birefringence of the core and realizing the polarization insensitivity.

In particular, if the geometrical birefringence $B_0$ can be regarded as 0, then the stress-induced birefringence can be canceled by determining the height d of the ridge so as to satisfy the condition that the horizontal stress component is equal to the vertical stress component. That is, when the stress is balanced as explained above, the change of the refractive index in the horizontal direction due to stress is equal to the change of the refractive index in the vertical direction due to stress, and thus the polarization dependence of the optical characteristics can be canceled.

In addition, in the present invention, control of the composition of the waveguide is unnecessary, so that reliability is not degraded at all.

Hereinafter, embodiments according to the present invention will be explained in detail with reference to the drawings.

First Embodiment

Figure 1B:
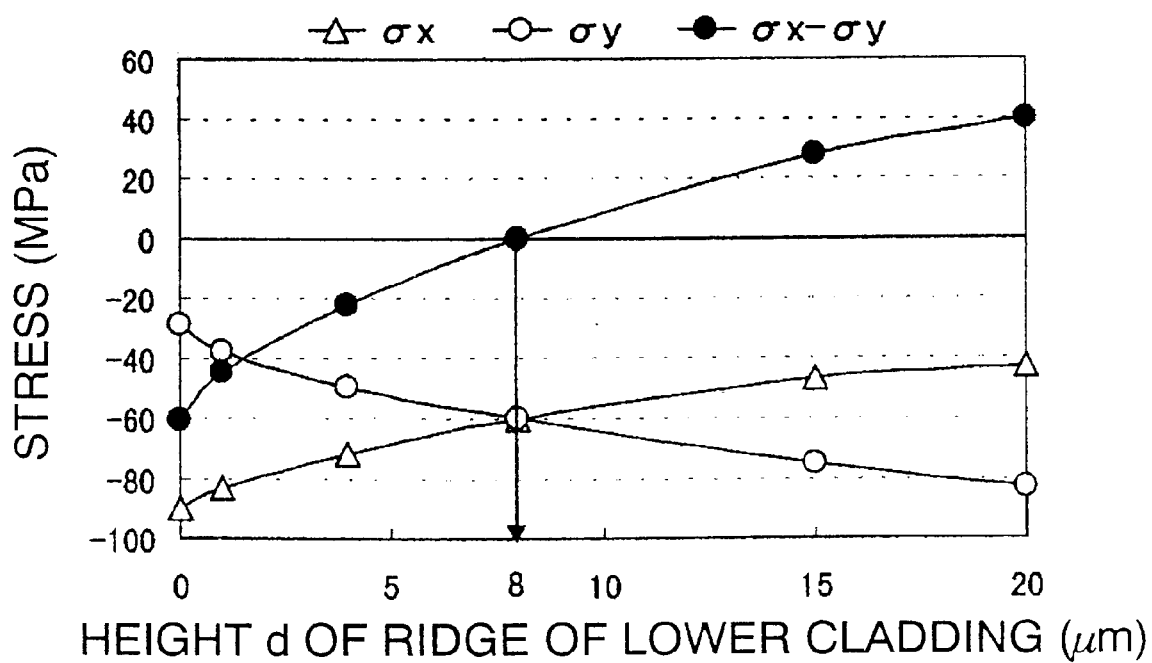
FIG. 1B is a graph showing the stress imposed on the core of the optical waveguide.
Figure 1C:
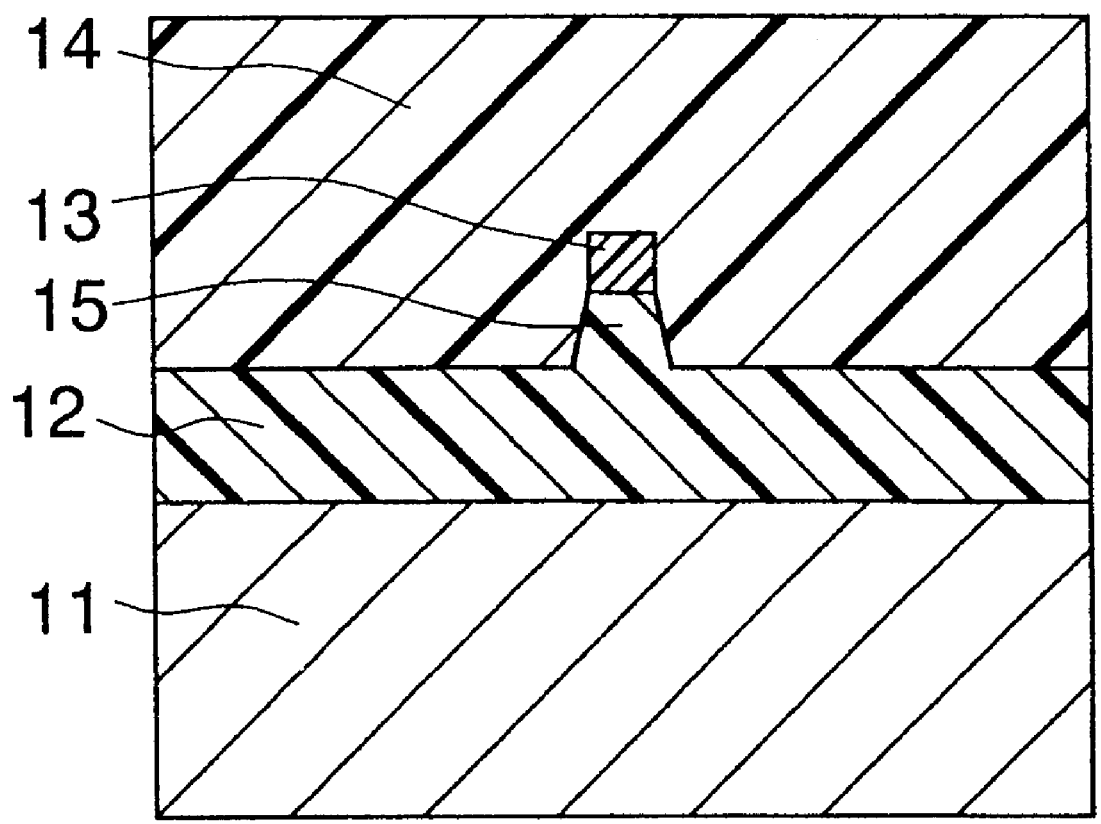
FIG. 1C is a cross-section of another embodiment of the optical waveguide according to the invention.

FIG. 1A is a cross-sectional view showing the general structure of the optical waveguide as the first embodiment of the present invention, and FIG. 1B is a graph showing the relevant stress imposed on the core.

Figure 5A:
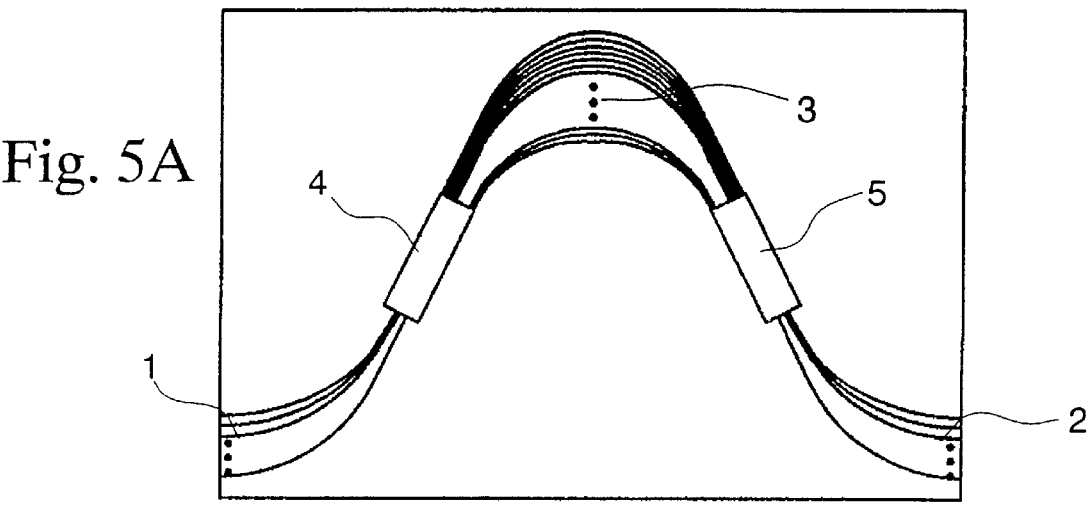
FIG. 5A is a diagram showing the general structure of an AWG type optical wavelength-division multiplexing and demultiplexing device.
Figure 5B:
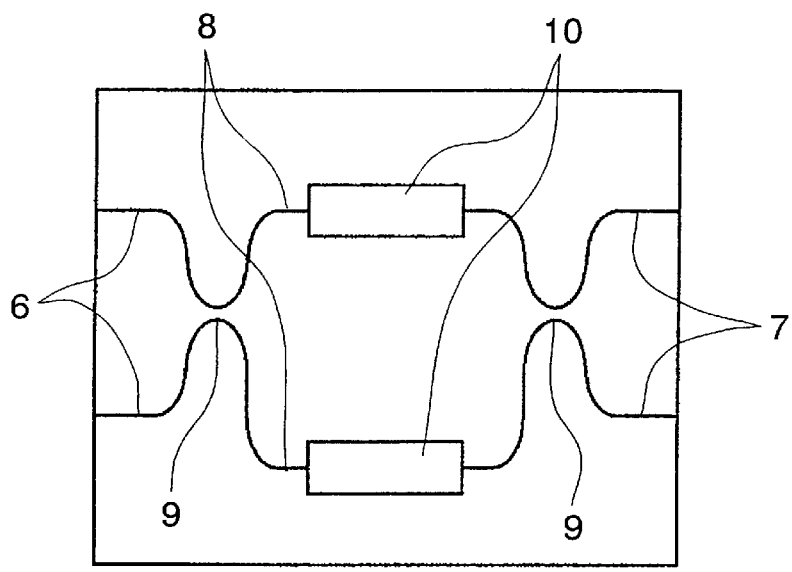
FIG. 5B is a diagram showing the general structure of an asymmetric MZI type attenuator.
Figure 6:
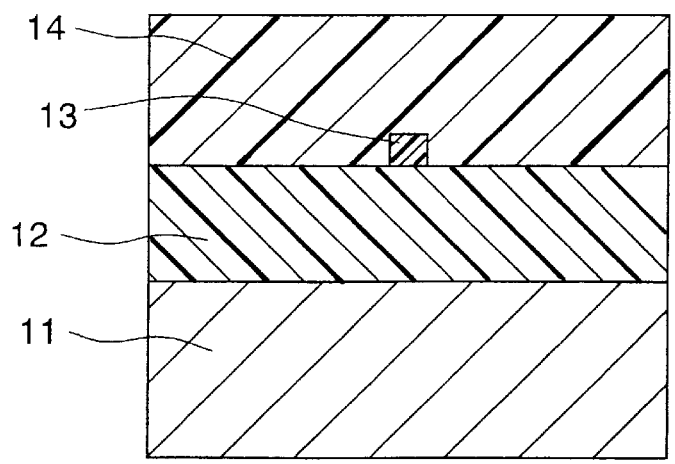
FIG. 6 is a cross-sectional view of a conventional optical waveguide.

As shown in FIG. 1A, the optical waveguide of the present embodiment comprises a lower cladding 12 formed on a substrate (typically, an Si substrate) 11, a core 13, an upper cladding 14, and a ridge 15 of the lower cladding 12. Here, a silica-based AWG type optical wavelength-division multiplexing and demultiplexing device (refer to the structure shown in FIG. 5A) having a plurality of waveguides, each having the structure shown in FIG. 1A, is formed, and "d" indicates the height of ridge 15.

The silica-based AWG type optical wavelength-division multiplexing and demultiplexing device of the present embodiment, formed on the substrate 11, has 32 channels at channel spacing of 100 GHz. The size of the cross section of the core 13 is 6 $\mu$m×6 $\mu$m, and the relative refractive index difference between the core 13 and the claddings (12 and 14) is 0.75%. In implementation, an FEM (finite element method: refer to the above Reference 4) was used for analyzing the stress distribution in the core 13 and the vicinity of the core, so as to determine the height of the ridge 15 of the lower cladding 12.

In the present embodiment, the cross section of the core has a square shape, and silica glass has no geometrical anisotropy. Therefore, geometrical birefringence can be disregarded. Accordingly, the height of the ridge can be determined so as to satisfy the condition that $\sigma x-\sigma y=0$.

The graph of FIG. 1B shows a horizontal component $\sigma x$ and a vertical component $\sigma y$ of the stress imposed on the core 13, and their difference $\sigma x-\sigma y$. Here, negative values indicate compressive stress.

When the height $d=0$ $\mu$m, $\sigma x$ is the ruling factor, and $\sigma x-\sigma y$ is −60 MPa. As the height d increases, $\sigma y$ decreases (corresponding to an increase of compressive stress) and $\sigma x$ increases (corresponding to a decrease of compressive stress). When the height $d=8$ $\mu$m (corresponding to 133% of the thickness of the core), $\sigma x-\sigma y$ is 0 Mpa, that is, the condition $n_{TM}=n_{TE}$ is satisfied, thereby realizing the polarization insensitivity of the optical characteristics.

Based on the above analysis, an optical waveguide circuit was practically fabricated. Various kinds of fabricating methods can be applied to silica-based optical waveguide circuits, such as a flame hydrolysis deposition (FHD) method, sputtering method, CVD method, and the like. In the present implementation, the FHD method was used.

Each optical waveguide of the optical waveguide circuit was fabricated according to the processes as shown in FIGS. 2A to 2E. First, a lower cladding layer 121, whose major component is $SiO_2$, was deposited on an Si substrate (i.e., a planar substrate) 11 by using the FHD method, and a core layer 131, whose major component is $SiO_2$, was further deposited, where $GeO_2$ was added as a dopant to the core layer. These deposited portions were consolidated by using an electric furnace (see FIG. 2A).

Figure 2A:
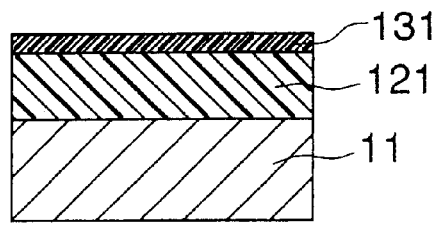
FIGS. 2A to 2E are cross-sectional views showing the structures in the processes of the method of fabricating the optical waveguide of the first embodiment.
Figure 2B:
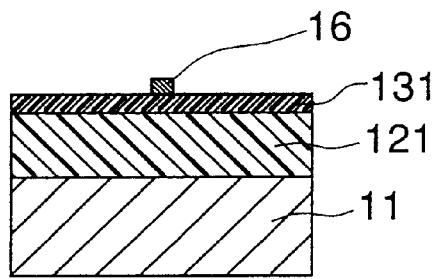
Figure 2C:
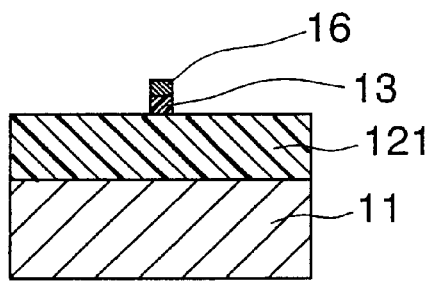

In the next process, a resist pattern 16 for a lightwave circuit was formed by photolithography (see FIG. 2B).

Figure 2D:
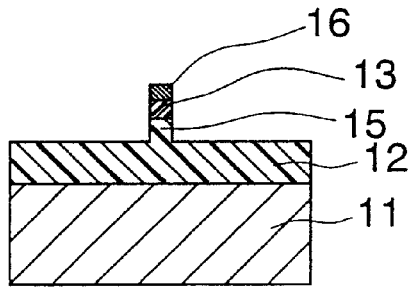
Figure 2E:
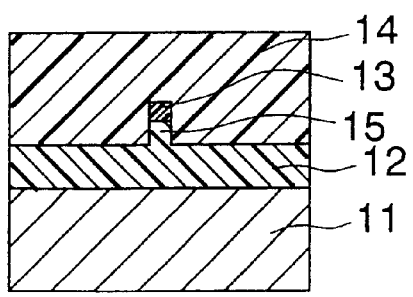

In the following process, unnecessary portions of the core layer were removed in the direction of their thickness by using RIE (reactive ion etching) (see FIG. 2C), and successively, a portion of 8-$\mu$m thickness (or depth) of the lower cladding layer was removed by etching, so that a lower cladding 12 and a ridge 15 were formed (see FIG. 2D).

In the final process performed after the resist pattern was removed, an upper cladding (layer) 14, whose major component is $SiO_2$, was formed to a thickness of 30 $\mu$m (see FIG. 2E) by the FHD method and the consolidation.

Figure 3A:
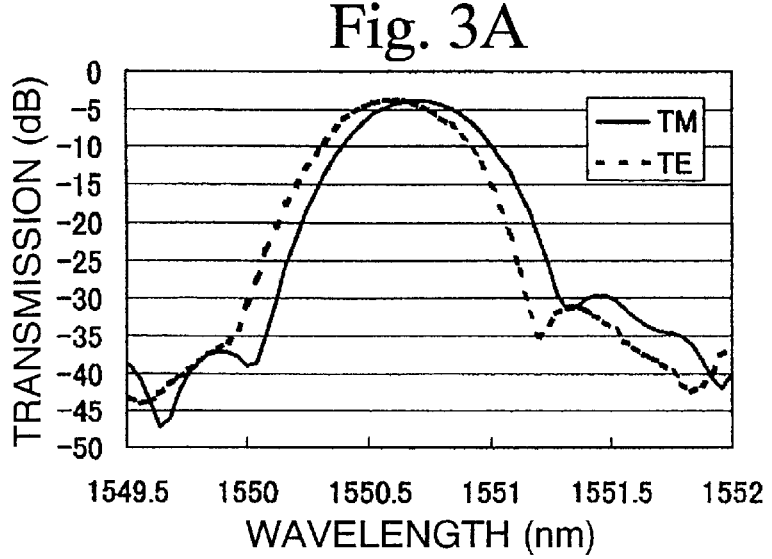
FIG. 3A is a graph showing an example of the optical transmitting characteristics of a conventional silica-based AWG type optical wavelength-division multiplexing and demultiplexing device.
Figure 3B:
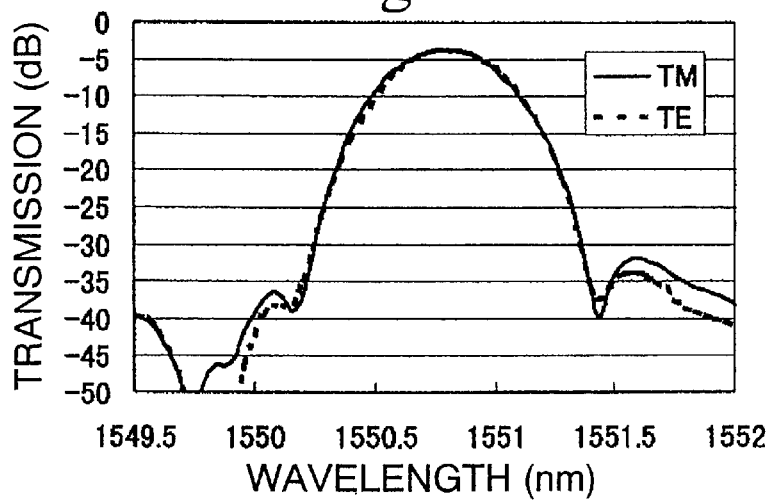
FIG. 3B is a graph showing an example of the optical transmitting characteristics of the silica-based AWG type optical wavelength-division multiplexing and demultiplexing device of the first embodiment of the present invention.

The graph of FIG. 3B shows optical transmitting characteristics, more specifically, the output characteristics of the waveguide positioned at the center port. As shown in the graph, the characteristic lines of the TE mode and TM mode almost agree with each other, so that it is obvious that polarization insensitivity was actually realized.

Additionally, the height d may be changed within a range from approximately 0.1 to 15 $\mu$m (corresponding to 3 to 200% of the thickness of the core) in consideration of the specifications and composition of the waveguide, and accordingly, polarization insensitivity can be realized under any conditions.

Second Embodiment

The optical waveguide of the second embodiment according to the present invention has a structure similar to that of the above-explained first embodiment (refer to FIG. 1A), and a silica-based AWG type optical wavelength-division multiplexing and demultiplexing device formed on an Si substrate 11 is also provided in the present embodiment. This device also has 32 channels with channel spacing of 100 GHz; however, the following specifications are different from the first embodiment: the size of the cross section is 3 $\mu$m×3 $\mu$m, and the relative refractive index difference between the core 13 and the claddings (12 and 14) is 2.5%.

According to stress analysis performed on this case, the condition for realizing polarization insensitivity is $d=0.15$ $\mu$m (i.e., 5% of the thickness of the core). Also in this embodiment, the cross section has a square shape, and silica glass has no geometrical anisotropy; thus, it is unnecessary to consider geometrical birefringence. That is, the height of the ridge is determined so as to satisfy the condition that $\sigma x-\sigma y$ is 0.

Figure 3C:
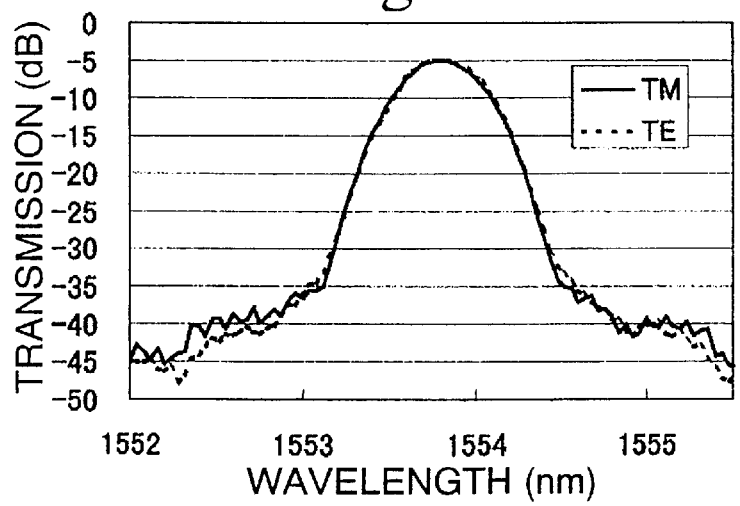
FIG. 3C is a graph showing an example of the optical transmitting characteristics of the silica-based AWG type optical wavelength-division multiplexing and demultiplexing device of the second embodiment of the present invention.

The fabricating processes are the same as those in the first embodiment (see FIGS. 2A to 2E). The optical transmitting characteristics of the optical waveguide circuit of the present embodiment are shown in FIG. 3C. As shown in the figure, polarization dependence can be negligible.

Third Embodiment

The optical waveguide of the third embodiment according to the present invention has a structure similar to that of the above-explained first embodiment (refer to FIG. 1A). However, in the present embodiment, a silica-based asymmetric MZI type attenuator using this optical waveguide is fabricated by a sputtering method. The size of the cross section of the core 13 is 7 μm×7 μm, and the relative refractive index difference between the core 13 and the claddings (12 and 14) is 0.45%. According to stress analysis, in the present embodiment, the polarization insensitivity can be realized under the condition that d=13 μm (i.e., 186% of the thickness of the core).

The fabricating processes are the same as those in the first embodiment. However, the method of forming the lower cladding 12, core 13, and upper cladding 14 is changed to the sputtering method.

Figure 4A:
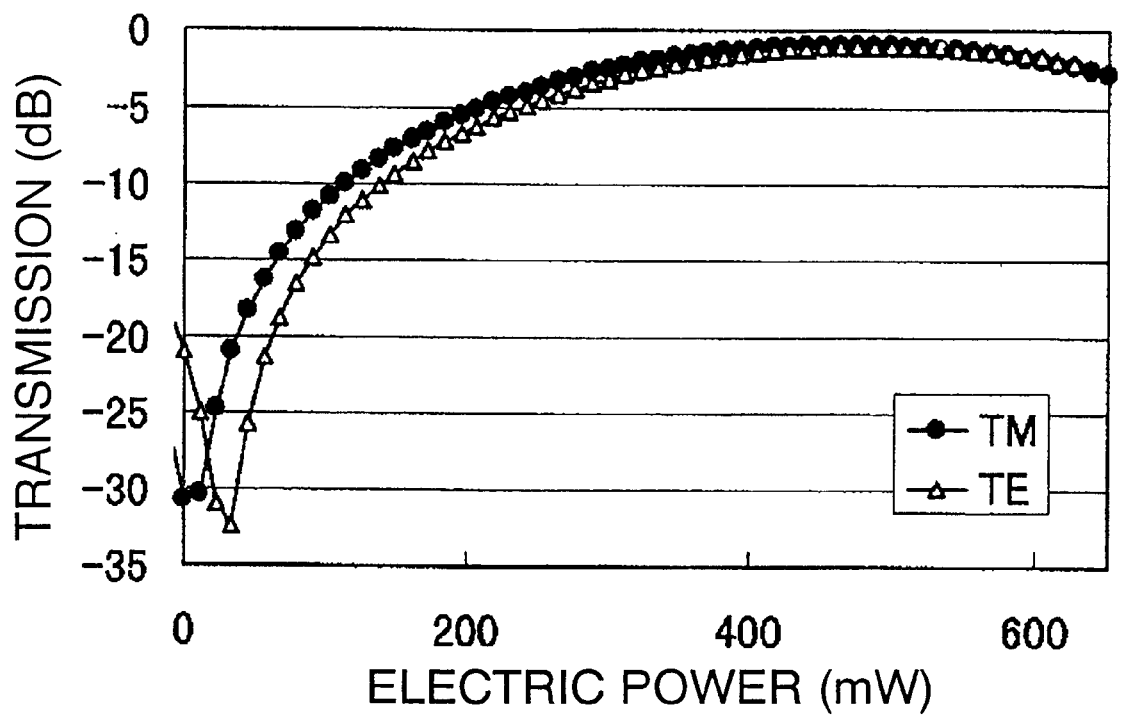
FIG. 4A is a graph showing an example of the optical transmitting characteristics of a conventional silica-based asymmetric MZI type attenuator.
Figure 4B:
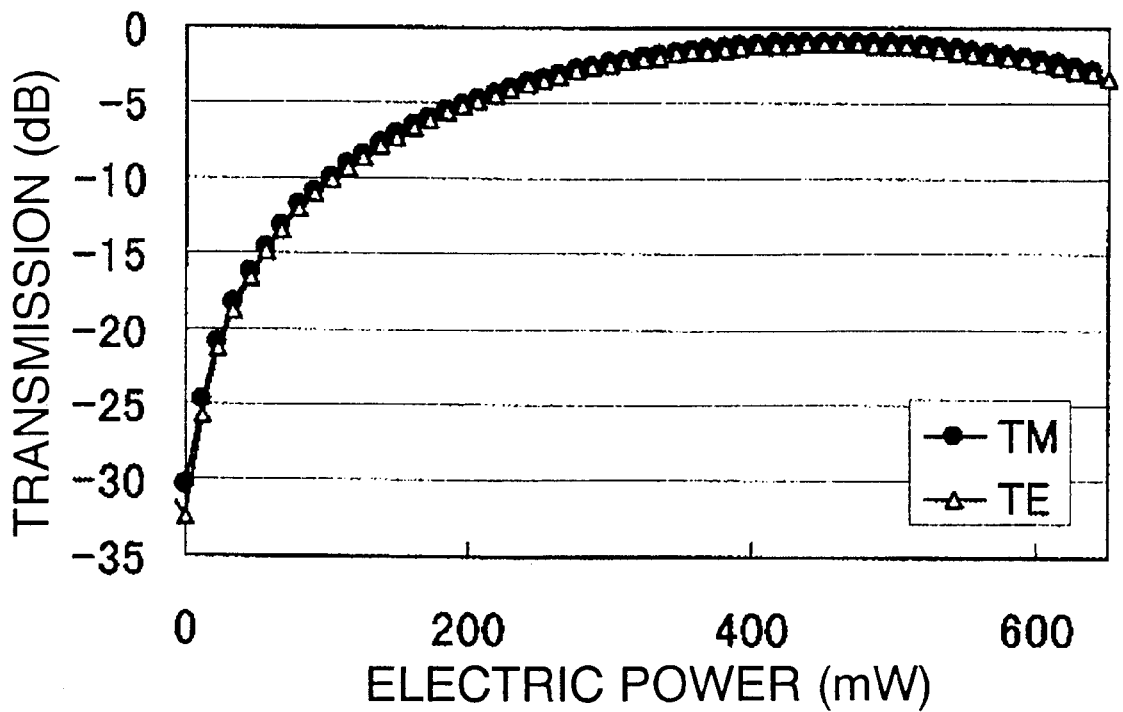
FIG. 4B is a graph showing an example of the optical transmitting characteristics of the silica-based asymmetric MZI type attenuator of the third embodiment of the present invention.

The optical transmitting characteristics of the optical waveguide circuit of the third embodiment are shown in FIG. 4B. As shown in the figure, the characteristics of the TM mode and TE mode well agree with each other, so that the polarization dependence is canceled.

Also in this embodiment, the cross section of the core has a square shape, and silica glass has no geometrical anisotropy; thus, it is unnecessary to consider geometrical birefringence. That is, the height of the ridge is determined so as to satisfy the condition that $\sigma x - \sigma y$ is 0.

As explained above, according to the first, second, and third embodiments, the stress imposed on the core 13 can be changed by forming the ridge 15 (of the lower cladding 12) under the core 13. As a result, a polarization-insensitive optical waveguide circuit can be realized.

Additionally, in the process of forming the core by dry etching, the ridge 15 of the lower cladding 12 is formed successively after the processing of the core; thus, no special or dedicated process of forming the ridge is necessary.

That is, according to the optical waveguide circuit and the method of fabricating an optical waveguide of the present invention, a polarization-insensitive optical waveguide circuit can be realized without degradation of the device characteristics and without increasing the burden imposed on the productivity and the cost. As explained above, no extra process for realizing polarization insensitivity is necessary; thus, only a slight burden is imposed on the productivity and the cost in order to realize polarization insensitivity.

In addition, polarization insensitivity can be realized by a very simple method of controlling the height of the ridge; thus, this method can be applied to various kinds of optical waveguide circuits made by different fabricating methods (e.g., the FHD method, sputtering method, CVD method, and spin coating method), made of different materials (e.g., silica glass or a polymer), having different compositions (such as the kind of dopant), and having different specifications (e.g., core size, refractive index, and relative refractive index difference).

The present invention can also be applied to various kinds of lightwave circuits such as wavelength-division multiplexing and demultiplexing devices, optical resonators, attenuators, thermo-optic switches using an asymmetric MZI, delay lines, and the like.

The present invention made by the present inventors has been concretely explained with reference to the embodiments; however, the present invention is not limited to these embodiments, and various modifications are possible within the scope and spirit of the present invention.

In the above embodiments, polarization insensitivity is realized. However, in regard to the specifications of each product, perfect polarization insensitivity is not always necessary, but small polarization dependence with a required low level may be provided, and the height and form of the ridge may be determined according to the required low level in consideration of the cost or the like.

For example, the width of the ridge of the lower cladding is equal to the width of the core in the above embodiments; however, the width of the ridge may be flexibly determined in consideration of the specifications. The width of the ridge is not necessarily constant (in the direction of the height); for example, the cross section of the ridge may have a trapezoidal shape.

However, preferably, the upper limit of the width of the ridge is approximately two times as much as the width of the core. This is because if the ridge width is too large, the stress distribution in the core and the vicinity of the core is similar to that of conventional optical waveguide circuits. In this case, even if the height of the ridge is changed, the stress distribution cannot be changed.

In addition, according to the material, composition, and specifications of the waveguide, the height of the ridge can be flexibly determined. According to each condition, the height of the ridge necessary for realizing polarization insensitivity may be low, such as 3% of the thickness of the core, or may be high, such as 200% of the thickness of the core. Preferably, the upper limit of the height of the ridge is approximately 200% of the thickness of the core. This is because it is difficult to cover a higher ridge (i.e., a ridge having a height larger than 200% of the thickness of the core) with the upper cladding.

What is claimed is:

1. An optical waveguide comprising:
    a planar substrate;
    a lower cladding on the planar substrate where the lower cladding has an upwards extending ridge;
    a core provided on the ridge of the lower cladding for transmitting light; and
    an upper cladding covering the core wherein:
        the ridge has a predetermined shape and size relative to the core to determine the stress imposed on the core in a manner such that polarization dependence of the optical waveguide is decreased to a required level.

2. An optical waveguide as claimed in claim 1, wherein the ridge has a shape predetermined so as to make the polarization dependence of the optical waveguide substantially zero.

3. An optical waveguide as claimed in claim 2, wherein the height of the ridge is determined so as to satisfy the condition that with given geometrical birefringence $B_0$ and photoelastic constants $C_1$ and $C_2$, a horizontal stress component $\sigma x$ imposed on the core from the upper and lower cladding and a vertical stress component $\sigma y$ imposed on the core from the upper and lower cladding have the following relationship:

$$\sigma x - \sigma y = B_0/(C_2 - C_1).$$

4. An optical waveguide as claimed in claim 2, wherein the height of the ridge is determined so as to satisfy the condition that a horizontal stress component $\sigma x$ imposed on the core from the upper and lower cladding is substantially equal to a vertical stress component $\sigma y$ imposed on the core from the upper and lower cladding.

5. An optical waveguide as claimed in claim 4, wherein the cross section of the core has a substantially square shape.

6. An optical waveguide as claimed in claim 1, wherein the planar substrate, the lower cladding, the core, and the upper cladding have the following relationship:

$$\rho_{sub} > \sigma_{upper} > \rho_{core} \geq \rho_{lower}$$

where $\rho_{sub}$, $\rho_{lower}$, $\rho_{core}$, and $\rho_{upper}$ are average thermal expansion coefficients of the planar substrate, the lower cladding, the core, and the upper cladding within the temperature range of $0 \leq T \leq T_S$, $T_S$ being the softening temperature of the upper cladding.

7. An optical waveguide as claimed in claim 1, wherein the planar substrate, the lower cladding, the core, and the upper cladding have the following relationship:

$$\rho_{sub} > \rho_{upper} > \rho_{lower} > \rho_{core}$$

where $\rho_{sub}$, $\rho_{lower}$, $\rho_{core}$, and $\rho_{upper}$ are average thermal expansion coefficients of the planar substrate, the lower cladding, the core, and the upper cladding within the temperature range of $0 \leq T \leq T_S$, $T_S$ being the softening temperature of the upper cladding.

8. An optical waveguide as claimed in claim 1, wherein the width of the ridge is equal to the width of the core.

9. An optical waveguide as claimed in claim 1, wherein the width of the ridge is not constant in the direction of its height.

10. An optical waveguide as claimed in claim 1, wherein the planar substrate is made of silicon.

11. An optical waveguide as claimed in claim 1, wherein the optical waveguide is made of silica-based glasses.

12. An optical waveguide circuit having at least one optical waveguide as claimed in claim 1.

13. An optical waveguide circuit as claimed in claim 12, which uses functions of optical interference.

14. An optical waveguide circuit as claimed in claim 13, which includes an arrayed-waveguide grating having a plurality of the optical waveguides.

15. An optical waveguide circuit as claimed in claim 13, which includes an asymmetric Mach-Zehnder interferometer having a plurality of the optical waveguides.

16. An optical waveguide as claimed in claim 1 wherein the height of the ridge is in the range between 3% to 200% the height of the core.

17. A method of fabricating an optical waveguide, comprising the steps of:

forming a lower cladding layer on a planar substrate;

forming a core layer on the lower cladding layer and processing the core layer to make a core of the optical waveguide, removing the lower cladding layer under the core layer to a predetermined depth to form a ridge on the lower cladding layer under the core of the optical waveguide; and forming an upper cladding layer to cover the processed core, wherein the ridge is formed to have a predetermined shape and size relative to the core so as to determine the stress which is imposed on the core in a manner such that polarization dependence of the optical waveguide is decreased to a required level.

18. A method of fabricating an optical waveguide, as claimed in claim 17, wherein in the step in which the ridge is formed, the ridge has a shape predetermined so as to make the polarization dependence of the optical waveguide substantially zero.

19. A method of fabricating an optical waveguide, as claimed in claim 18, wherein the height of the ridge is determined so as to satisfy the condition that with given geometrical birefringence $B_0$ and photoelastic constants $C_1$ and $C_2$, a horizontal stress component $\sigma x$ imposed on the core from the upper and lower cladding and a vertical stress component $\sigma y$ imposed on the core from the upper and lower cladding have the following relationship:

$$\sigma x - \sigma y = B_0/(C_2 - C_1).$$

20. A method of fabricating an optical waveguide, as claimed in claim 18, wherein the height of the ridge is determined so as to satisfy the condition that a horizontal stress component $\sigma x$ imposed on the core from the upper and lower cladding is substantially equal to a vertical stress component $\sigma y$ imposed on the core from the upper and lower cladding.

21. A method of fabricating an optical waveguide, as claimed in claim 20, wherein in the step in which the core is formed, the cross section of the core has a substantially square shape.

22. A method of fabricating an optical waveguide, as claimed in claim 17, wherein the planar substrate, the lower cladding, the core, and the upper cladding have the following relationship:

$$\rho_{sub} > \rho_{upper} > \rho_{core} \geq \rho_{lower}$$

where $\rho_{sub}$, $\rho_{lower}$, $\rho_{core}$, and $\rho_{upper}$ are average thermal expansion coefficients of the planar substrate, the lower cladding, the core, and the upper cladding within the temperature range of $0 \leq T \leq T_S$, $T_S$ being the softening temperature of the upper cladding.

23. A method of fabricating an optical waveguide, as claimed in claim 17, wherein the planar substrate, the lower cladding, the core, and the upper cladding have the following relationship:

$$\rho_{sub} > \rho_{upper} > \rho_{lower} > \rho_{core}$$

where $\rho_{sub}$, $\rho_{lower}$, $\rho_{core}$, and $\rho_{upper}$ are average thermal expansion coefficients of the planar substrate, the lower cladding, the core, and the upper cladding within the temperature range of $0 \leq T \leq T_S$, $T_S$ being the softening temperature of the upper cladding.

24. A method of fabricating an optical waveguide, as claimed in claim 17, wherein in the step in which the ridge is formed, the width of the ridge is made equal to the width of the core.

25. The method as claimed in claim 17 wherein the height of the ridge is in the range between 3% to 200% the height of the core.

* * * * *